United States Patent

Gooding

[11] Patent Number: 5,915,819
[45] Date of Patent: Jun. 29, 1999

[54] ADAPTIVE, ENERGY ABSORBING STRUCTURE

[76] Inventor: Elwyn Gooding, 2989 NW. Territorial Rd., Ann Arbor, Mich. 48105

[21] Appl. No.: 08/915,037

[22] Filed: Aug. 20, 1997

Related U.S. Application Data

[60] Provisional application No. 60/031,839, Nov. 26, 1996.

[51] Int. Cl.⁶ ............................ A43B 13/20; A43B 23/07
[52] U.S. Cl. ............................ 36/29; 36/71; 36/55; 36/10
[58] Field of Search .................... 36/71, 55, 10, 36/88, 29, 28, 3 R, 3 B; 5/706, 707

[56] References Cited

U.S. PATENT DOCUMENTS

| | | | |
|---|---|---|---|
| 682,141 | 9/1901 | Galloway | 36/3 B |
| 1,539,283 | 5/1925 | Staats-oels | 36/29 |
| 2,315,391 | 3/1943 | Blair | 36/3 R |
| 2,334,719 | 11/1943 | Margolin | 36/3 |
| 2,851,390 | 9/1958 | Chavannes | 36/3 R |
| 3,716,930 | 2/1973 | Brahm | 36/3 |
| 3,760,056 | 9/1973 | Rudy | 36/71 |
| 4,112,599 | 9/1978 | Krippelz | 36/3 R |
| 4,566,137 | 1/1986 | Gooding | 2/413 |
| 4,670,995 | 6/1987 | Huang | 36/29 |
| 4,674,203 | 6/1987 | Göller | 36/44 |
| 4,999,931 | 3/1991 | Vermeulen | 36/29 |
| 5,155,927 | 10/1992 | Bates et al. | 36/28 |
| 5,175,946 | 1/1993 | Tsai | 36/29 |
| 5,304,271 | 4/1994 | Gusakov | 5/707 |
| 5,365,678 | 11/1994 | Shibata | 33/29 |
| 5,545,463 | 8/1996 | Schmidt et al. | 428/178 |
| 5,607,749 | 3/1997 | Strumor | 5/707 |

*Primary Examiner*—M. D. Patterson
*Attorney, Agent, or Firm*—Gifford, Krass, Groh, Sprinkle, Anderson & Citkowski, P.C.

[57] ABSTRACT

An adaptive, energy absorbing body includes a plurality of fluid filled cells joined together by fluid flow passageways so as to establish an intercommunicating structure which provides effective cushioning. The cells also include pressure responsive seals which restrict fluid flow between the cells when the cells are subjected to a mechanical force above a pre-selected level. Closure of the seals converts the material from open cell, to a closed cell structure, allowing it to absorb and dissipate high levels of kinetic energy. The structure is particularly useful as a shock absorbing element for footwear.

20 Claims, 7 Drawing Sheets

ADAPTIVE, ENERGY ABSORBING STRUCTURE

RELATED APPLICATION

This patent application claims priority of provisional patent application Ser. No. 60/031,839 filed Nov. 26, 1996.

FIELD OF THE INVENTION

The subject matter of this invention relates to structures employed in shoes, protective equipment, and the like, for absorbing and dispersing mechanical energy. More specifically, the subject of this invention is energy absorbing and dispersing structures having a plurality of interconnected, fluid filled cells. In a most specific embodiment, the invention relates to an adaptive, energy absorbing and dispersing structure comprised of a plurality of interconnected fluid filled cells in which fluid communication between the cells is controlled in response to the magnitude of the energy applied to the structure.

BACKGROUND OF THE INVENTION

Structures for absorbing and dispersing mechanical energy are incorporated into shoes, sporting goods, clothing, protective equipment, vehicles and the like to provide user comfort and safety. Such structures function to absorb and distribute kinetic energy and thereby prevent damage or discomfort resultant from impacts. Energy absorbing and dispersing structures are frequently employed in shoes as innersoles, midsoles, heel liners, metatarsal supports, and padding on tongues and uppers, to cushion and comfort a wearer. Such structures are also incorporated into football helmets, crash helmets, ballistic vests and the like to minimize damage from energetic impacts.

Energy absorbing and dispersing structures are frequently fabricated from polymeric foam materials, of either the open or closed cell type. In other instances, such structures are comprised of bodies of fibrous materials, and in yet other instances, mechanical structures employing springs, pistons and the like are used as energy dispersing devices.

The operating range of an energy absorbing and dispersing structure is a parameter which must be adjusted for particular applications. If the force applied to such a structure exceeds its operational range, the structure will bottom out, and in some instances the structure will actually undergo irreversible break down. Bottoming out occurs when a structure can absorb no more energy, and ceases to provide any protection. For example, soles of shoes often include energy absorbing structures fabricated from open cell foam materials, and such materials provide a high degree of cushioning under relatively light stress loads; however, when high levels of force are applied to these materials, as for example when the wearer jumps, runs or stumbles, the cellular structure of the material flattens, and the innersole bottoms out allowing a jarring shock to be transmitted to a wearer's foot. This bottoming out can be accommodated by providing a thicker body of foam material; however, such increases in thickness are generally unacceptable in footwear. Furthermore, using a thicker body of foam in the sole of a shoe will produce discomfort and fatigue under low stress conditions, as encountered when walking or standing. Another approach is to employ a foam material having a higher degree of resiliency. This can be accomplished by utilizing a relatively stiff open cell foam structure, or by going to a closed cell foam, or other such structure which includes sealed air pockets. In either instance, the stiffer sole will provide adequate cushioning for high shock levels, but is very rigid under low shock conditions, thereby producing discomfort.

What is needed is an energy absorbing structure which has a very large dynamic operating range. That is to say, a structure which is fairly yielding under relatively low impact conditions, but becomes more rigid under high shock conditions. Furthermore, in many applications such as footwear, clothing and protective equipment, it is also desirable that any such energy absorbing and dispersing structure be relatively lightweight and thin.

Also, it is often desirable that an energy absorbing structure operate to redistribute energy. For example, an innersole of a shoe may advantageously redirect pressure from the ball of the foot to the arch region, so as to provide enhanced arch support under high impact conditions. Such energy redirection cannot be accomplished by foams.

A number of energy absorbing structures have been implemented in the prior art. For example, U.S. Pat. No. 4,566,137 discloses a protective helmet having a series of relatively large, interconnected, pneumatic chambers therein. Each of the chambers includes an internal baffle member which operates to control flow of air between chambers so as to allow for equilibration of air pressure when the helmet structure is being fitted and inflated, but to restrict air flow under high impact conditions. While the structure disclosed therein can provide a high degree of shock protection to a wearer's head, the necessity for employing an internal baffle structure dictates that the pneumatic chambers be few, large and relatively thick. This precludes use of this particular structure in configurations employing many relatively small, thin chambers. Thus, the device of the 137 patent cannot be readily adapted for use in shoes and the like.

Shoe sole structures comprised of a series of discrete or interconnected air-filled chambers are known in the art. Some examples of such structures are shown in U.S. Pat. Nos. 4,999,931; 4,670,995; 5,545,463 and 5,175,946, among others; however, none of these structures can function in an adaptive manner so as to adjust their resiliency in response to the magnitude of an applied force.

In some instances shoe soles have been manufactured which include resilient plates of metal or carbon reinforced polymer. These resilient plates can absorb shock over a fairly large operating range; but they do not act in an adaptive manner. In addition, they are bulky and expensive. Also, such energy absorbing plates are not capable of redistributing pressure, and they cannot be readily employed to cushion shoe tongues, uppers or heel liners.

Thus, there is need for an energy absorbing and dispersing structure which has a large dynamic operating range. Specifically, there is a need for a structure which can adapt to applied forces so as to effectively absorb both large and small shocks without being too rigid at low impact and without bottoming out or breaking down at high impact. There is also a need for a structure which can redirect force from one region to another. Furthermore, any such device should be easy to manufacture, miniaturizable and relatively thin and lightweight, so as to permit it to be employed in footwear, athletic equipment, clothing and the like.

As will be explained in detail hereinbelow, the present invention provides an adaptive, energy absorbing structure which adjusts its resiliency in response to applied force. The structure of the present invention is manufactured from a few relatively simple sheets of resilient, preferably polymeric, material, and does not require the affixation of additional elements thereto. These and other advantages will be readily apparent from the drawings, discussion and description which follow.

BRIEF DESCRIPTION OF THE INVENTION

There is disclosed herein an adaptive, energy absorbing structure which may be employed as a component of a shoe, helmet liner, cushioning body or other such protective structure. The material of the present invention is comprised of a first and a second member which are joined together. Each member is fabricated from a resilient material, such as a closed cell foam or the like, and the members are disposed in a superposed relationship. The first and second members are configured so as to define a plurality of chambers therebetween. Each chamber has an upper wall defined by one of the members and a lower wall defined by the other of the members. At least one of the walls is resiliently biasable toward the other, so as to permit the chambers to be compressed. The first and second members are also configured so as to define a plurality of fluid flow channels in the device. Each channel is in fluid communication with two of the chambers. The first and second members are further configured so as to define a plurality of pressure responsive seals. Each seal is associated with a respective one of the chambers and each seal is operative to prevent the flow of fluid from the chamber, into the fluid flow channel, when the chamber is subjected to a compressive force above a predetermined level. In this manner, when the structure is subjected to impact below the predetermined seal level, it will function as an essentially open cell material in which fluid flows freely between the various chambers so as to dissipate, absorb and redirect energy. When the applied impact exceeds the predetermined sealing level, the seals close off the chambers from the fluid channels converting the material to an essentially closed cell structure which absorbs higher levels of energy without bottoming out.

In particular embodiments, the seals are comprised of flanges disposed on one of the walls of the chamber, and these flanges are positioned so as to engage the other wall of the chamber when a compressive force is applied to the chamber. The flanges are preferably circumferentially disposed about the entirety of the chamber.

In one particular embodiment of the present invention, which is particularly well adapted for use in a sole of a shoe, the chambers are segregated into zones, with the chambers comprising each zone being interconnected in fluid communication with one another, but not with members of different zones.

DETAILED DESCRIPTION OF THE INVENTION

In accord with the present invention, there is provided an energy absorbing structure which is capable of adapting its resiliency to the magnitude of an applied force. As a consequence, the structure of the present invention has a very large, dynamic operating range and is capable of effectively absorbing a wide range of kinetic input.

The structure of the present invention is comprised of a plurality of fluid filled chambers, interconnected by fluid flow channels, also referred to as passageways. The chambers are configured so that the passageways remain open when relatively minor compressive forces are applied thereto; as such, the material functions as an open cell type of structure. When higher levels of force are applied to the material, the passageways are closed, and the material behaves as a closed cell structure. This combination of behaviors allows for the manufacture of an energy absorbing structure which is capable of accommodating very large variations in impact, but is relatively thin and lightweight. As will be explained in further detail hereinbelow, this combination of properties makes the material of the present invention ideally suited as a cushioning and energy absorbing structure for footwear and for protective equipment such as helmets, padding, and the like.

Figure 1:
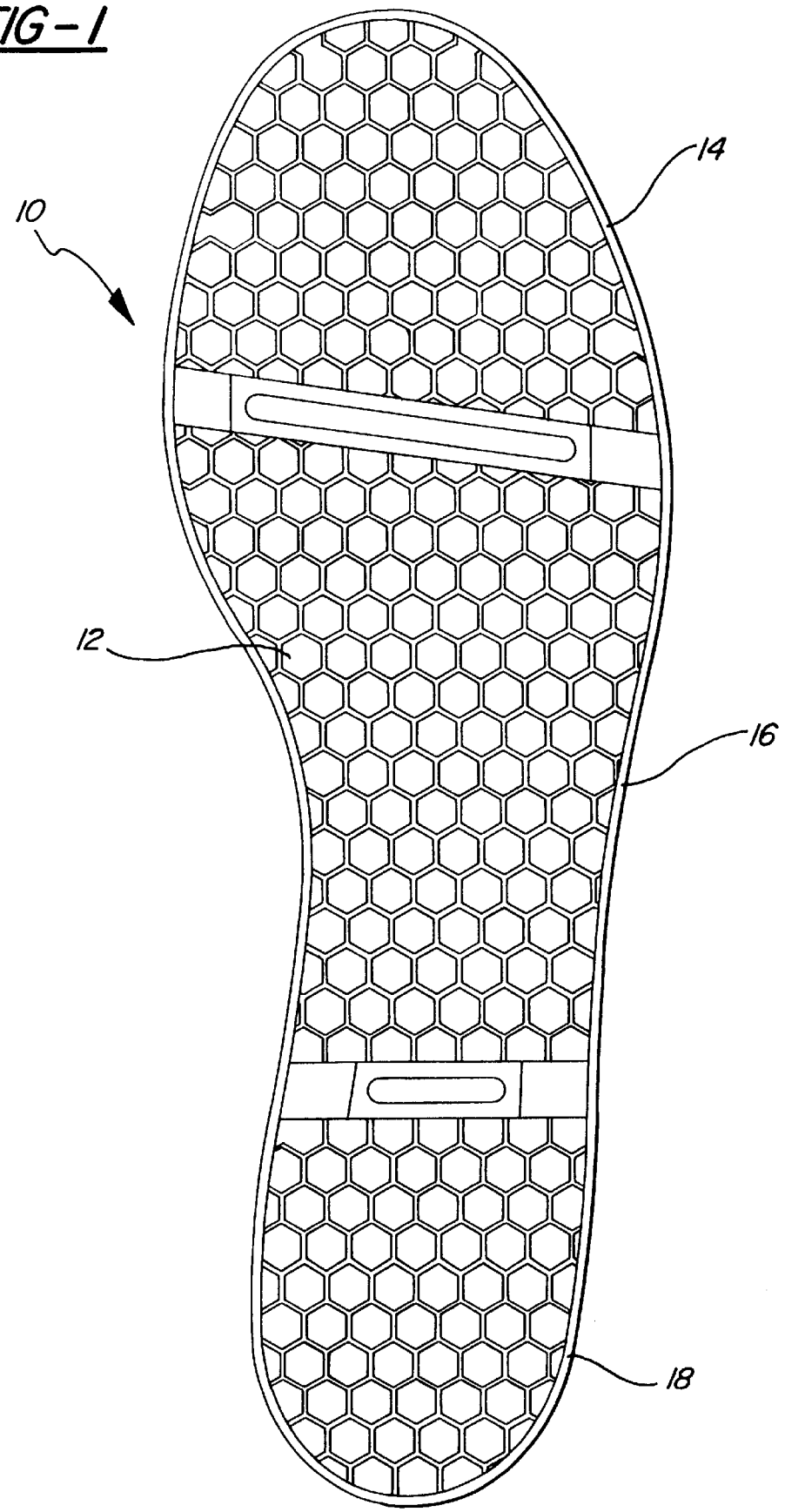
FIG. 1 is a top plan view of one embodiment of an energy absorbing shoe sole structure configured in accord with the principles of the present invention.

Referring now to FIG. 1, there is shown a top, plan view of a shoe sole 10 configured in accord with the principles of the present invention. The shoe sole 10 of the FIG. 1 embodiment is depicted as being an inner sole of a shoe; but it is to be understood that the present technology may also be employed to manufacture mid soles, and outer soles of shoes, as well as being utilized for other portions of the shoe, such as the tongue or upper.

The shoe sole 10 of FIG. 1 includes a plurality of cells, for example cell 12, each configured in a hexagonal shape. It is to be also understood that in other embodiments, the cells may be otherwise configured, for example as circular members, triangular members, squares, and the like. Also, while all of the cells in the FIG. 1 embodiment are of generally similar size and shape, it should be understood that the principles of the present invention may also be utilized in conjunction with cellular structures having cells of various sizes.

As will be further detailed, the cells of the FIG. 1 embodiment are interconnected so that fluid may flow therebetween when moderate loads are applied to the structure; but so that fluid flow is terminated under higher levels of loading. It is further to be noted that in the FIG. 1 embodiment, the cells constituting the sole member 10, are segregated into three separate zones. The first zone 14 is the toe portion of the sole; a second portion 16 covers the mid-foot region, and a third portion 18 covers the heel portion. In the FIG. 1 embodiment, cells in each of the zones are interconnected to one another, but are not connected to members of an adjoining zone. This permits separate cushioning of the three regions of the foot. In other embodiments of the present invention, zones may be otherwise configured. For example, cells of the toe portion may be in fluid communication with cells proximate the metatarsal region of the sole so as to redistribute pressure from the toe region to the metatarsal region of a wearer's foot. This particular embodiment is advantageous when utilized in high heeled shoes. In yet other embodiments of the invention, the cells may be otherwise zoned, or may be unzoned so that all cells are in fluid communication with one another.

Figure 2:
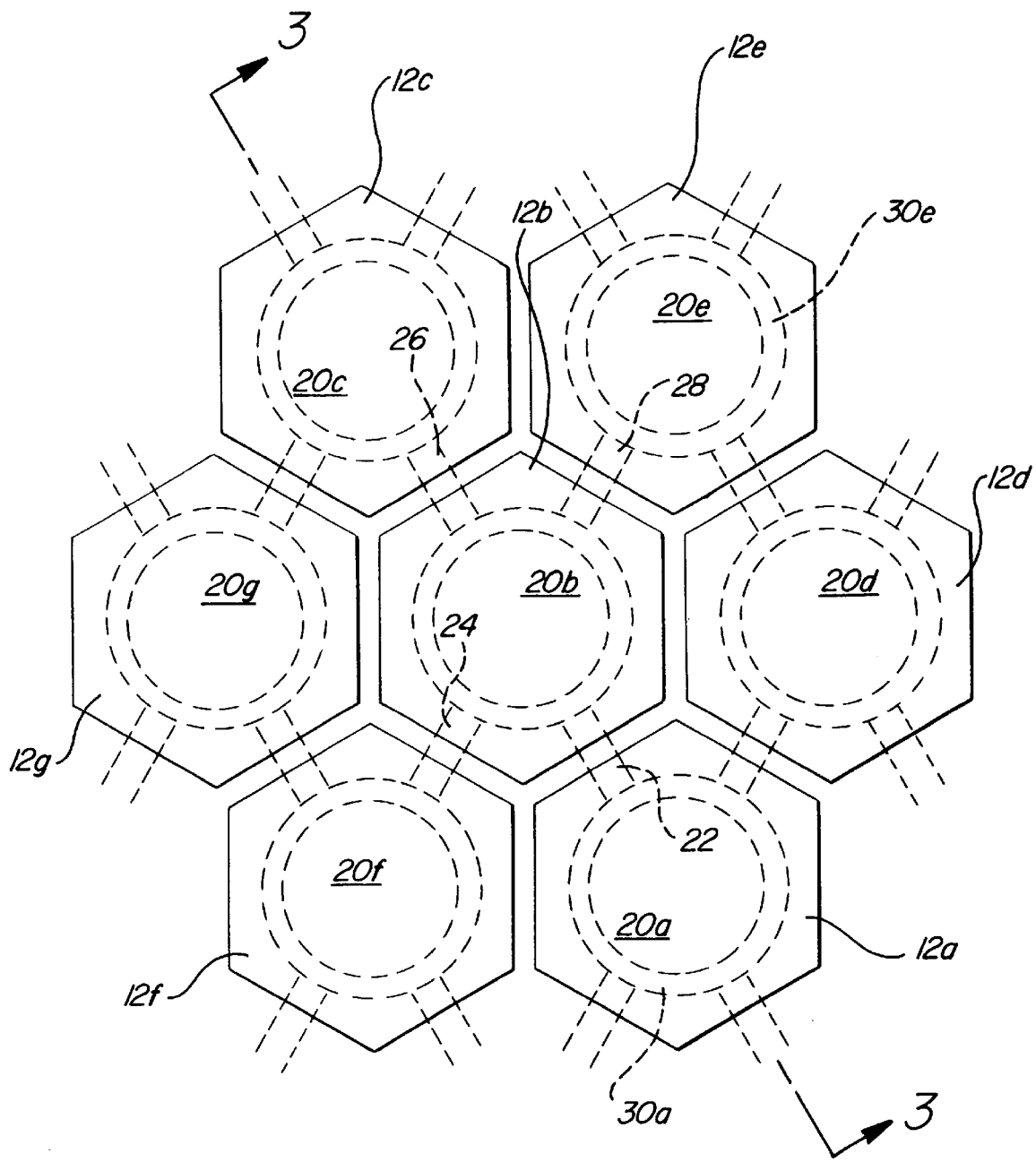
FIG. 2 is an enlarged, fragmentary view of a portion of the shoe sole of FIG. 1.

Referring now to FIG. 2, there is shown an enlarged view of a portion of the sole 10 of FIG. 1, specifically depicting seven of the cells 12a–12g thereof. It is further to be noted that in the FIG. 2 embodiment, internal structures of the cells are shown in phantom outline. As will be seen from FIG. 2, each of the cells 12 includes a separate chamber 20 defined therein. Each structure further includes a plurality of channels, which are disposed so as to establish fluid communication between chambers of adjoining cells. In the illustrated, FIG. 2 embodiment, each chamber 20 has four passage ways associated therewith. Each establishes fluid communication to an adjoining chamber. For example, Chamber 20b is: in fluid communication with chamber 20a via passage 22; in fluid communication with chamber 20f via passage 24; in fluid communication with chamber 20c via passage 26, and in fluid communication with chamber 20e via passage 28. Obviously, other patterns of interconnection may be apparent. In most instances, the working fluid in the chambers 20 will be air, or some other gaseous material. However, the structures of the present invention may also utilize liquids or gels as a working fluid.

Each of the cells 12 further includes a pressure responsive sealing flange 30 associated therewith. As illustrated, with regard to the FIG. 2 embodiment, each flange 30 surrounds substantially all of the perimeter of the chamber 20 and communicates directly with all of the passage ways entering that chamber 20. As will be further described hereinbelow, the flange 30 operates to selectively seal the passage ways, when force of a predetermined magnitude is applied to the cell 12.

Figure 3:
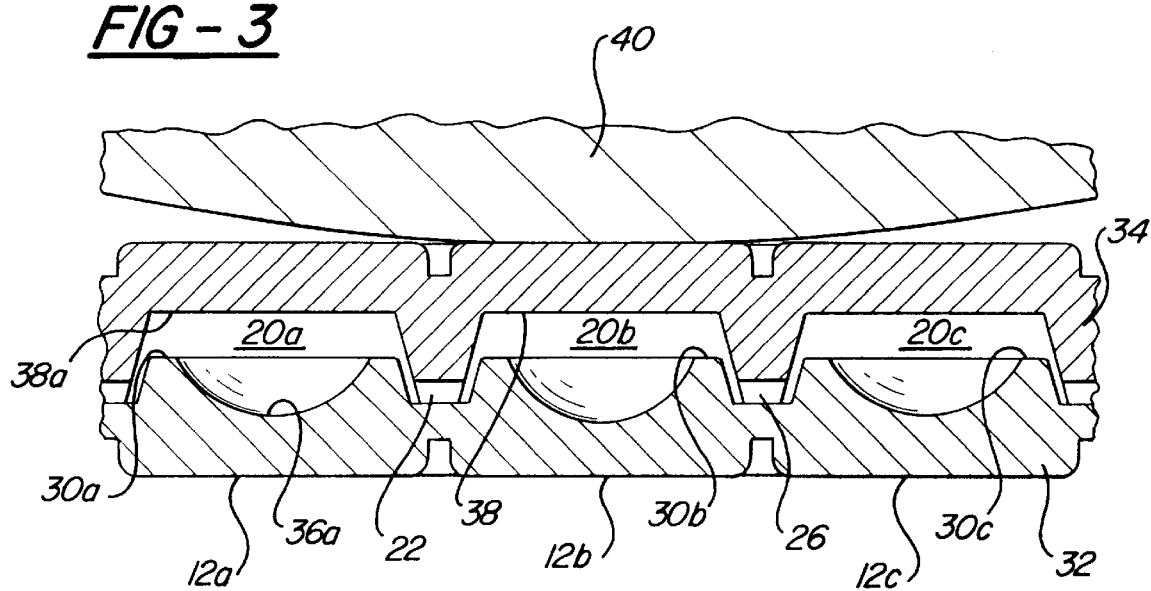
FIGS. 3–5 are cross-sectional views of the shoe sole structure of FIG. 2 taken along lines 3—3, and showing the structure at various stages of compression.

In FIG. 3, there is shown a cross-sectional view of the adaptive, energy absorbing structure of FIG. 2, taken along line 3—3. Specifically illustrated in FIG. 3 are three cells 12a, 12b and 12c which comprise the illustrated portion of the shoe sole structure. The cells 12 are defined by a first sheet like member 32 and a second sheet like member 34 which are formed from a resilient material and are joined together in a superposed relationship.

The first 32 and second 34 members are configured so as to define a plurality of chambers 20 therebetween, such that one chamber 20 is associated with each of the cells 12. For example, cell 12a includes chamber 20a which has a lower wall 36a, defined by the first member 32, and an upper wall 38a defined by the second member 34. It will be noted that the lower wall 36a includes a hemispherical depression therein which enhances the cushioning ability of the structure of the present invention. This depression is optional. Also, in some embodiments, the depression, if included, may be otherwise shaped.

The first 32 and second 34 members are further configured so as to define a number of fluid flow channels which establish fluid communication between the chambers 20. For example, passage way 22 extends between chamber 20a and chamber 20b; while passage way 26 extends between chamber 20b and 20c.

The first 32 and second 34 members are further configured to define a plurality of pressure responsive seals, and each seal is associated with one of said chambers 20 and operates to prevent fluid flow from that chamber 20 to a fluid flow channel which is in communication with that chamber 20 when the walls of the chamber 20 are biased together with a force which exceeds a predetermined level. For example, in the FIG. 3 embodiment, the first member 32 is configured so as to define a sealing flange 30 which is associated with each chamber 20. For example, chamber 20a has a flange 30a defined therein by the first member 32. This flange 30a is defined in the bottom wall 36a of the chamber 20a and surrounds substantially all of the perimeter of the hemispherical depression therein. A similar arrangement is established with regard to the remaining cells.

The first 32 and second 34 members comprising the energy absorbing structure are fabricated from a resilient material such as a polymeric material. One particularly preferred resilient material comprises closed cell polymeric foam, with ethylene vinyl acetate (EVA) foam being one particularly preferred foam. In one specific embodiment of the present invention, the first member 32 is fabricated from EVA closed cell foam having a six pound per cubic foot density, and the second member 34 is fabricated from EVA closed cell foam having a four pound per cubic foot density. In particular embodiments, the second member 34 has a fabric covering bound to the top surface thereof. Still other polymeric materials may be employed in the present invention. For example, urethane, polyethylene, or polypropylene foams may be similarly employed. In some instances, the members will preferably be made from a non-foamed polymer, particularly in those instances where a relatively thick structure is being prepared.

Operation of the illustrated embodiment of the invention will be described with reference to FIGS. 3–5. As specifically shown in FIG. 3, the energy absorbing structure is being contacted by a weight, typically the foot of a wearer, and a portion thereof is shown at reference numeral 40. As will be apparent from FIG. 3, the contact between the weight 40 and the shoe sole structure is such as to not impress any significant loading on to the structure. Accordingly, the first member 32 and second member 34 are not deformed.

Figure 4:
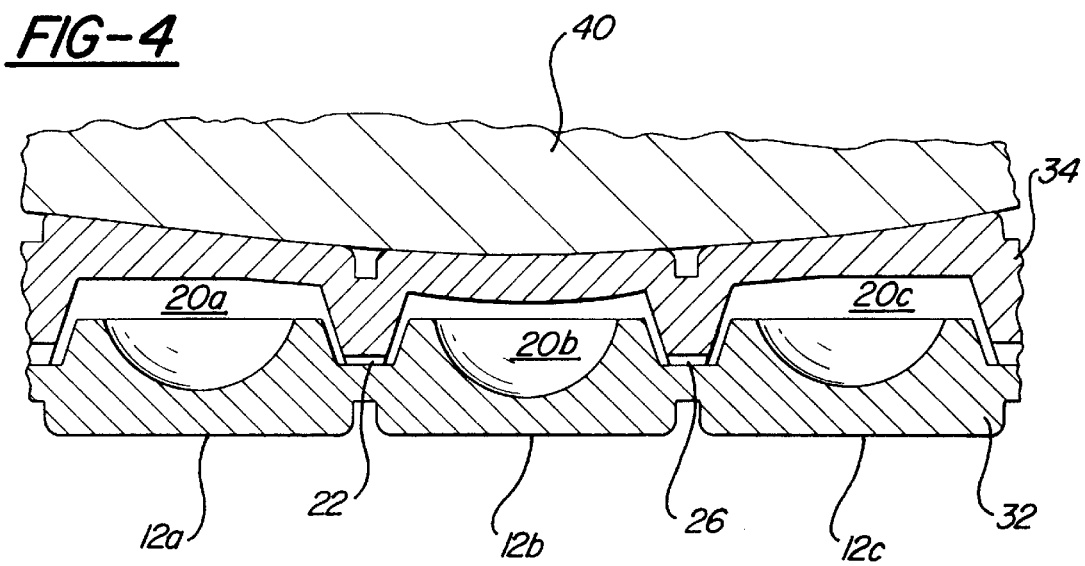

Referring now to FIG. 4, wherein like structures are referred to by like reference numerals, there is shown a partial compression of the structure by the weight 40. This compression distorts the second member 34 and compresses the chambers 20. It should be noted that compression is greatest at the center of the structure, and chamber 20b is compressed to the greatest degree, while chambers 20a and 20c are compressed to a lesser degree. As the structure is compressed, a portion of the working fluid, typically air, is driven from chamber 20b into chambers 20a and 20c via channels 22 and 26. This flow of fluid provides a cushioning effect, and redistributes pressure. In addition, some further degree of cushioning is provided by the material comprising the first 32 and second 34 members, all of which in this instance are fabricated from a closed cell foam.

Figure 5:
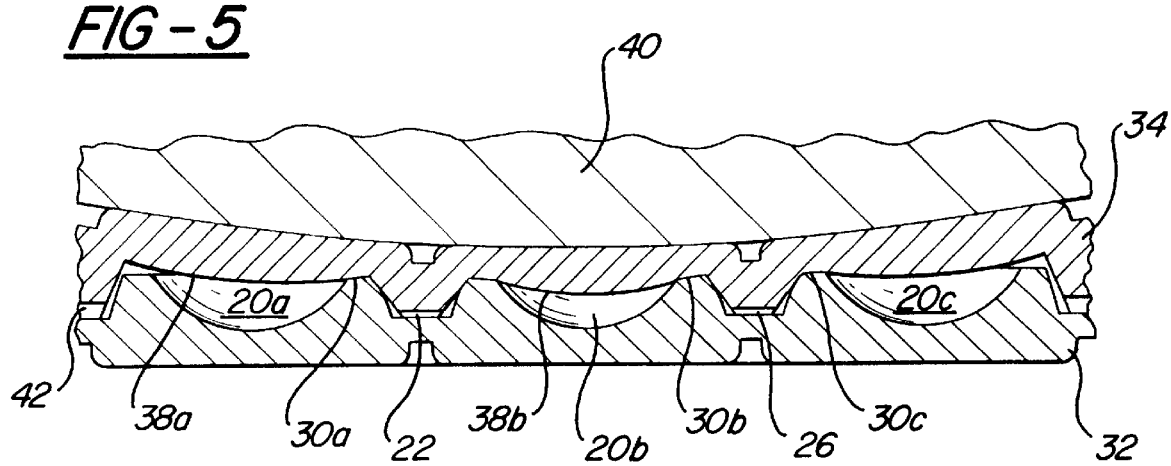

FIG. 5 illustrates the structure under a higher degree of compression. As will be seen, the chambers 20a–20c are still further compressed. As a result of the compression, the flange 30b engages the upper wall 38b of the chamber 20b, effectively sealing the chamber so that flow of fluid through the channels 22, 26 is prevented. In this manner, chamber 20b becomes a closed cell, and its resistance to compression is significantly greater than when it was in an open cell configuration. It will also be noted in FIG. 5 that flange 30a of chamber 20a partially bears against the upper wall 38a. In this manner, passsage 22 is still further sealed off, increasing the isolation of chamber 20b from chamber 20a. It will also be noted that flange 30a does not fully engage the upper wall 38a, and the remaining channel 42, which is in communication with chamber 20a, is only partly blocked. This permits some small flow of fluid from chamber 20a, making the chamber intermediate between a fully closed and a fully opened cell structure. A similar configuration is noted with regard to chamber 20c. It will further be noted in regard to FIG. 5, that as a result of loading, the material comprising the first member 32 and the second member 34 is still further compressed in bulk, thereby providing further cushioning.

It will be appreciated from reference to FIGS. 3–5 that the material of the present invention adapts its resiliency to the applied load. Under relatively light loadings, the material is fairly compressible, thereby providing a relatively soft cushion. However, as loads increase, the cell structure becomes fully closed thereby providing a higher degree of resiliency. Thus, the material can cushion high levels of impact, while still remaining soft and comfortable under more normal loads.

Figure 6:
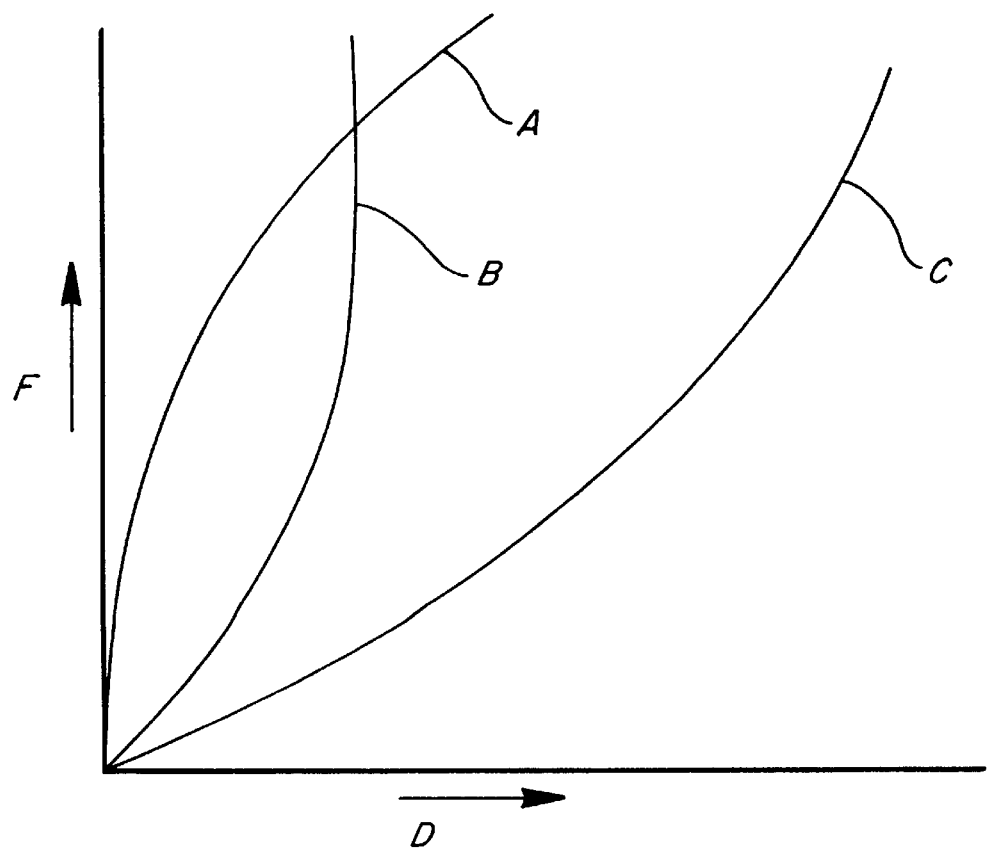
FIG. 6 is a graph comparing the energy absorption profiles of energy absorbing structures of the prior art with that of a structure of the present invention.

Referring now to FIG. 6, there is shown a graphic representation of the performance of the energy absorbing structures of the present invention, as compared to the performance of prior art structures. FIG. 6 is a graphic depiction of applied force versus degree of deformation for a prior art, closed cellular cushioning structure shown at Curve A, a prior art open cell cushioning structure shown at Curve B, and the material of the present invention shown at Curve C.

The material of Curve A comprises a resilient body having a number of closed, non-intercommunicating, gas filled cells therein. It will be noted that the material deforms to a very small degree, as increasing force is applied. As force levels further increase, the material begins to yield more. This provides a structure which, while capable of absorbing fairly large impacts, is relatively hard under lighter loads. If the material corresponding to Curve A is utilized as a shoe sole component, it will provide a relatively hard feel, and transmit normal impacts associated with walking and running directly to a wearer's foot, but it will provide impact absorption for extraordinary kinetic loads.

The material of Curve B in FIG. 6 corresponds to a relatively soft, open cell foam material of the type utilized for conventional cushioning inner soles in shoes. This material deforms to a relatively high degree at low force levels, but quickly bottoms out so that no further deformation occurs once a threshold level of force has been reached. This material will provide effective cushioning for normal impacts, but is useless for high level impacts. While the materials of Curve A and Curve B could be combined into a single inner sole unit, to do so would produce a relatively thick, heavy article, which is not compatible with many applications.

Curve C of FIG. 6 depicts the behavior of the material of the present invention. As will be seen, the material can be fabricated to provide a very high degree of deformation under low loads, and a lesser degree of deformation under high loads. In this manner, the material will feel relatively soft, but will be capable of absorbing large impacts.

The present invention provides for the manufacture of relatively light weight, thin, energy absorbing structures. The structures of the present invention are readily fabricated by conventional techniques. For example, the first 32 and second 34 members may be injection molded from polymeric resin materials. Alternatively, the members may be fabricated by embossing sheet stock of polymeric material. In either instance, the two members are readily joined together by techniques such as adhesive bonding, ultrasonic welding, dielectric welding, or by thermal bonding. In those instances where thermal bonding is to be carried out, it is contemplated that the first and second members constituting the energy absorbing body are each supported, in a spaced apart relationship, by an appropriate fixture. In a subsequent step, the remaining surfaces of the members are heated, as for example by radiation from a heated plate, hot air or the like, and the hot surfaces are pressed together to cause thermal welding. Adhesive bonding, ultrasonic bonding or dielectric welding may be similarly implemented in accord with techniques well known in the art.

Figure 7:
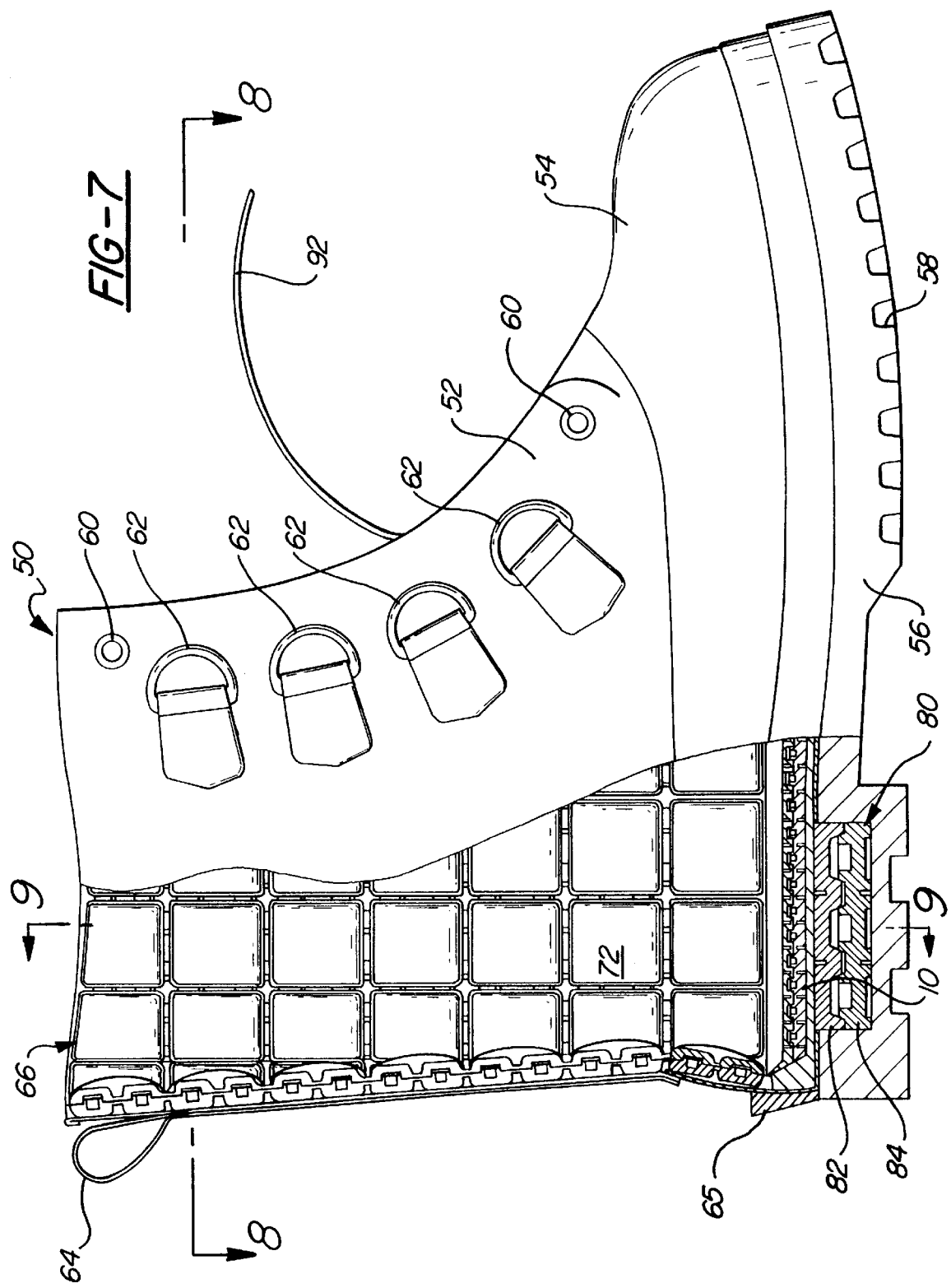
FIG. 7 is a partial cut-away view of a boot, incorporating several aspects of the present invention.
Figure 8:
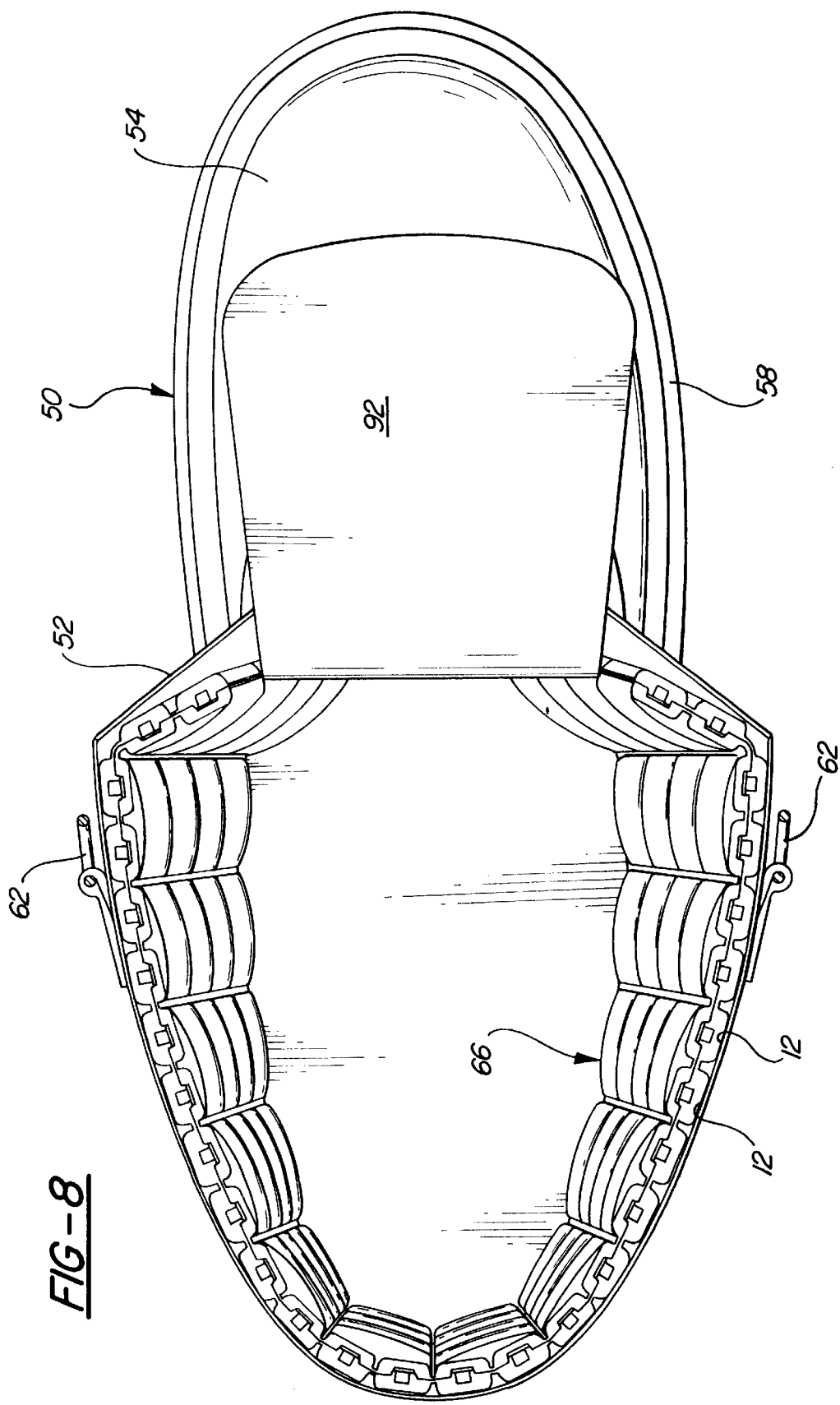
FIG. 8 is a cross-sectional view of the boot of FIG. 7, taken along line 8—8.
Figure 9:
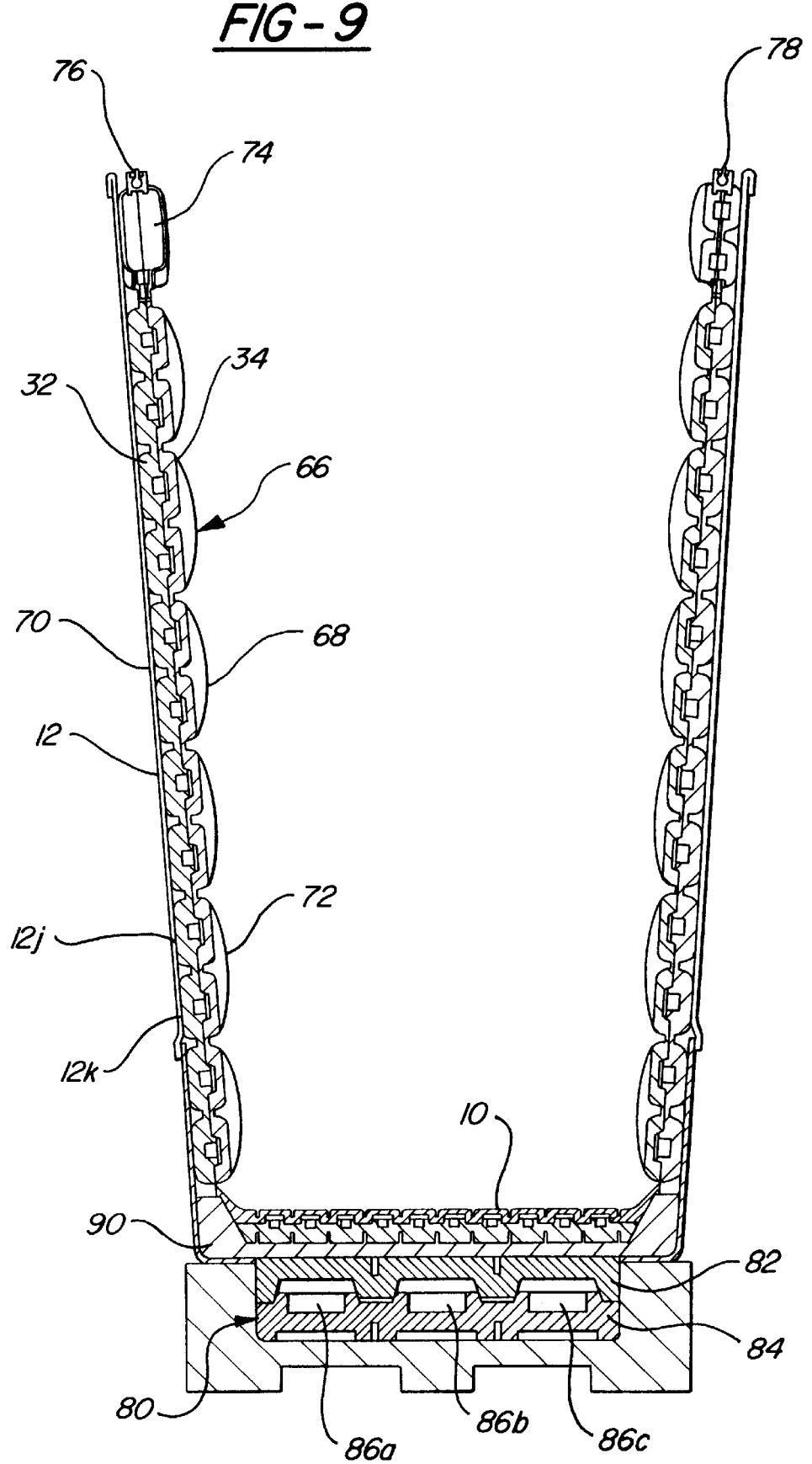
FIG. 9 is a cross-sectional view of the boot of FIG. 7, taken along line 9—9.

The principles of the present invention may be incorporated into a variety of items including footwear, headgear, protective vests and the like. FIGS. 7–9 depict a boot which incorporates various features of the present invention.

Referring now to FIG. 7, there is specifically shown a partial cut-away view of a boot 50 incorporating various embodiments of adaptive, energy absorbing structures of the present invention. The boot 50 includes an upper portion 52 which, in this embodiment, is formed from relatively soft leather, and a vamp portion 54 which is formed from a waterproof elastomer such as polyurethane. The boot 50 includes a sole 56 which is bonded to the vamp 54 and which is fabricated from a relatively hard material such as 60–70 durometer polyurethane. As is conventional in the art, the sole 56 includes a cleated tread pattern 58 molded there into. As is also conventional, the boot 50 includes eyelets 60, lacing loops 62, a pull strap 64, and a removal assist nubbin 65.

In accord with the present invention, the boot 50 includes an adaptive energy absorbing liner 66. This liner 66 is shown in cross-section in FIG. 9, and it includes a plurality of adaptive, energy absorbing cells 12 as previously described. Each of the cells 12 includes a central chamber which is in fluid communication with chambers of other cells by means of fluid flow passageways, and each chamber includes a pressure-responsive sealing mechanism as previously described. What is notable about the liner 66 is that the cells are further encapsulated by first 68 and a second 70 flexible, gas impervious sheet of material, and these sheets 68, 70 are selectively sealed against the first 32 and second, 34 members forming the cells 12, so as to produce a quilted structure which defines a plurality of capsules, 72; each capsule, in this embodiment, includes four of the cells 12. For example, in FIG. 9, Cells 12j and 12k are shown in cross-section as being contained in capsule 72, and it is to be understood that two more of the cells are also contained therein.

In this manner, a number of adaptive, energy absorbing cells 12 are contained within a fluid-filled capsule 72, and the capsules 72 of the liner 66 are in fluid communication with one another. This provides for a cushioning effect which isolates the wearer from relatively light loads. The adaptive cells 12 are within this fluid-filled capsule 72, and are available to accommodate and absorb high levels of impact. The liner may cover the entire interior of the boot 50, or only a portion thereof.

As is further shown in FIG. 9, the liner 66 of the present invention includes an inflation pump 74, which has a check valve 76 associated therewith. The pump 74 is utilized to fill the capsules 72 with air so as to adjust the fit of the boot 50 for optimum wearer comfort. The liner 66 further includes a deflation valve 78.

In the illustrated embodiment, the first member 32 comprising each of the cells 12 is fabricated from a six pound density closed cell foam, which is most preferably a polyurethane or ethylene vinyl acetate (EVA) foam. The second member 34 is most preferably fabricated from a four pound density polyurethane or EVA foam. In a preferred embodiment, the capsules 72 are made from thermoformed polyurethane and the outer surface of the capsules is covered with a low friction, moisture absorbing fabric or similar material, and one preferred covering material comprises a fabric sold under the trade name ETC. In one preferred embodiment, the liner 66 may be made so as to be removable from the boot. In some instances, the boot 50 may include a fastener such as separable hook and loop fastener material for retaining the liner 66. Permanently bonded liners 66 may be similarly employed.

The boot 50 further includes an inner sole 10 which is generally similar to the energy absorbing inner sole structure described hereinabove. The boot 50 also includes an adaptive, energy absorbing structure 80 of the present invention incorporated in the heel portion thereof. It will be seen from FIG. 9, the heel structure 80 comprises an upper member 82 and a lower member 84, which in this embodiment are fabricated from 12 pound density closed cell foam. The members 82, 84 define a series of cells, for example cells 86a, 86b and 86c which are configured generally in accord with those cells described in FIGS. 1–5.

The boot 50 further includes a semi-flexible sole panel 90 disposed between the inner sole and heel structure 80. This panel 90 is a relatively rigid, but flexible panel preferably fabricated from a polymeric material reinforced with fibers such as graphite fibers or aramid fibers of the type sold under the designation Kevlar®.

Referring now to FIG. 8, there is shown a top, cutaway view of the boot 50 of FIG. 7 taken along line 8—8. FIG. 8 illustrates the liner 66 and shows a number of cells 12 as disposed in the capsules 72. It will be noted from FIG. 8 that the liner does not cover the tongue 92 portion of the boot 50. While it is possible to include a cushioning structure on the tongue 92, the liner 66, as illustrated in FIG. 8 is configured to wrap around the front of the foot when the boot 50 is laced; hence the tongue 92, need not be cushioned.

The liner design described with reference to FIGS. 7–9 may be otherwise configured. For example, the number of cells 12 within a capsule 72 may be varied. Also, a multi-layered structure may similarly be fabricated to include several layers of capsules 72. The boot 50 of the present invention provides a high degree of cushioning, in addition the liner 66 is a good thermal insulator which protects the wearer from temperature extremes.

While the foregoing invention has been described primarily with reference to a cushioning structure for a shoe sole, it is to be understood that the invention is not so limited. For example, sheet like bodies of the material in the present invention may be employed as cushioning bodies for other portions of footwear, for headgear, for protective vests, pads and the like. In some instances, the cell structure and the chambers may be made to be relatively large, typically on the order of several centimeters to tens of centimeters; while in other instances, the cellular structure may be on the millimeter and submillimeter level. In view of the teaching presented herein, numerous modifications and variations of the invention will be readily apparent to those skilled in the art. The foregoing drawings, discussion and description are illustrative of particular embodiments of the invention, but are not meant to be limitations upon the practice thereof. It is the following claims, including all equivalents, which define the scope of the invention.

I claim:

1. An adaptive, energy absorbing shoe structure comprising:
   a first and a second member, each being fabricated from a resilient material, said first and second members being disposed in a superposed relationship;
   said first and second members being configured so as to define a plurality of chambers therebetween, each chamber having an upper wall defined by one of said members and a lower wall defined by the other of said members, at least one of said upper wall and said lower wall being formed of a resilient material so that said wall is biasable toward the other;
   said first and second members also being configured so as to define a plurality of fluid flow channels, each channel being in fluid communication with two of said chambers, and each chamber including at least two of said fluid flow channels in communication therewith, whereby each chamber is in direct fluid communication with at least two other chambers;
   said first and second members being further configured to define a plurality of pressure responsive seals, each seal being associated with a respective one of said chambers, and being operative to restrict the flow of a fluid from said chamber to a fluid flow channel which is in fluid communication with said chamber, when the upper wall of said chamber and the lower wall of said chamber are resiliently biased toward one another with a force which exceeds a predetermined level.

2. A shoe structure as in claim 1, wherein each pressure responsive seal comprises a flange which is defined upon one of said upper wall and said lower wall of the respective chamber, said flange being disposed so as to sealably engage the other of said upper wall and lower wall when said force exceeds said predetermined level.

3. A shoe structure as in claim 2, wherein said flange encompasses the entire perimeter of said chamber.

4. A shoe structure as in claim 1, wherein said first and second member are each fabricated from polymeric material.

5. A shoe structure as in claim 4, wherein said polymeric material is a closed cell polymeric foam.

6. A shoe structure as in claim 5, wherein said closed cell polymeric foam is a polyurethane foam.

7. A shoe structure as in claim 1, wherein said first and second member are joined together so that the only fluid communication between the chambers is through the fluid flow channels.

8. A shoe structure as in claim 7, wherein said first and second members are joined together by an adhesive bond.

9. A shoe structure as in claim 7, wherein said first and second members are joined together by a fusion bond.

10. A shoe structure as in claim 1, wherein said chambers are filled with a gaseous fluid.

11. A shoe structure as in claim 10, wherein said gaseous fluid is air.

12. A shoe structure as in claim 1, wherein said chambers are segregated into a plurality of zones in which the chambers comprising each zone are all in mutual fluid communication with only the members of that zone.

13. A shoe structure as in claim 1, which is configured as part of a sole.

14. A shoe structure as in claim 13, wherein said sole is an innersole.

15. An adaptive, energy absorbing body comprising:
   a first and a second member, each being fabricated from a resilient material, said first and second members being joined together in a superposed relationship;
   said first and second member being configured so as to define a plurality of chambers therebetween, each chamber having an upper wall defined by one of said members and a lower wall defined by the other of said members, at least one of said upper wall and said lower wall being formed of a resilient material so that said wall is biasable toward the other;

said first and second members also being configured so as to define a plurality of fluid flow channels, each channel being in fluid communication with two of said chambers, and each chamber including at least two of said fluid flow channels in communication therewith, whereby each chamber is in direct fluid communication with at least two other chambers;

said first and second members being further configured to define a plurality of pressure responsive seals, each seal being associated with a respective one of said chambers, and being operative to restrict the flow of a fluid from said chamber to a fluid flow channel which is in fluid communication with said chamber, when the upper wall of said chamber and the lower wall of said chamber are resiliently biased toward one another with a force which exceeds a predetermined level.

16. An adaptive, energy absorbing body as in claim 15, further including:

a first layer of encapsulant material disposed atop said first member; and a second layer of encapsulant material disposed atop said second members;

said first and second layers being sealed together so as to define at least one capsule which encloses at least two of said chambers.

17. An adaptive, energy absorbing body as in claim 16, wherein at least one of said first and second layers has a layer of fabric bonded thereto.

18. An adaptive, energy absorbing structure as in claim 16, wherein said at least one capsule has an air pump in fluid communication therewith for inflating said capsule.

19. An adaptive, energy absorbing structure as in claim 16, wherein said at least one capsule has a valve in fluid communication therewith for controlling the passage of fluid into and out of said capsule.

20. An adaptive, energy absorbing structure as in claim 15, wherein at least one of said first and second layers comprises a layer of a thermoformed polyurethane.

* * * * *